Apr. 24, 1923.
M. J. LOEHLER
1,452,838
ROTARY MOLD FOR MOLDING MILLING CUTTERS BY CENTRIFUGAL FORCE
Filed Feb. 3, 1922  2 Sheets-Sheet 1
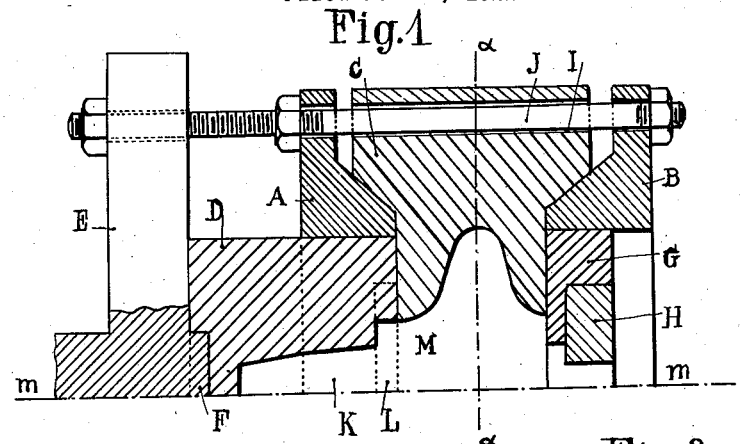
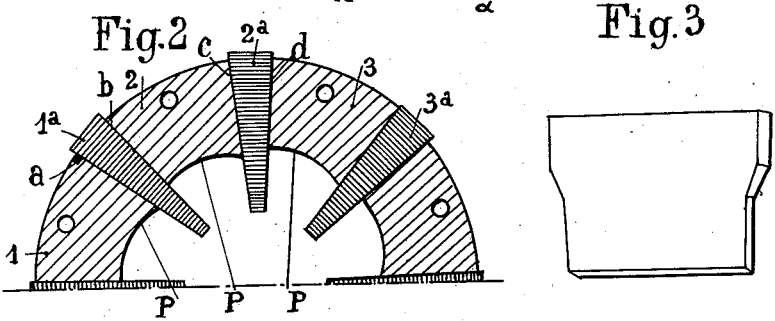
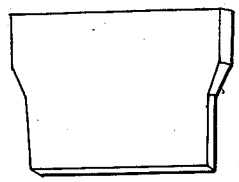
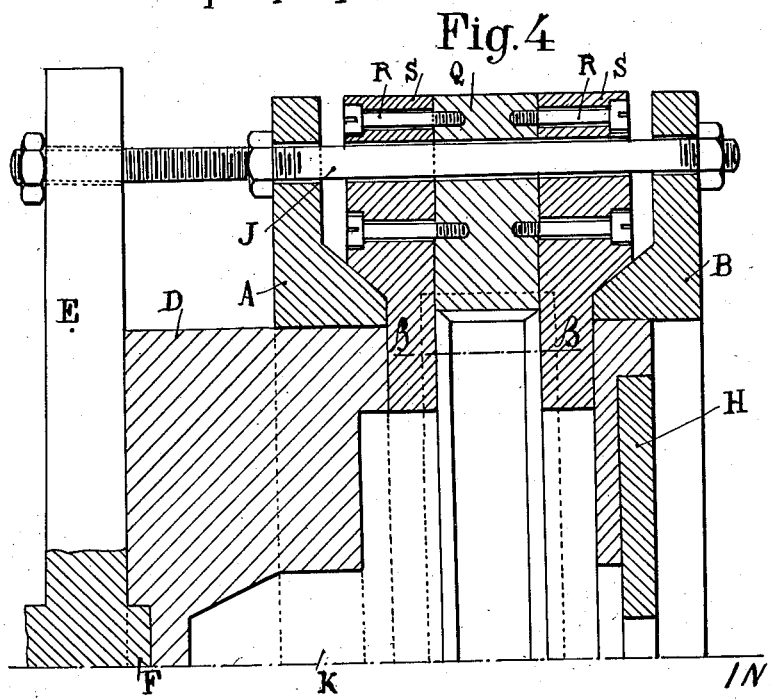
INVENTOR
Martial Joseph Loehler
BY Townsend & Decker
ATTORNEYS.

Apr. 24, 1923.                                                                    1,452,838
                              M. J. LOEHLER
      ROTARY MOLD FOR MOLDING MILLING CUTTERS BY CENTRIFUGAL FORCE
                           Filed Feb. 3, 1922           2 Sheets-Sheet 2

INVENTOR
Martial Joseph Loehler
BY Townsend & Decker
ATTORNEYS.

Patented Apr. 24, 1923.

1,452,838

UNITED STATES PATENT OFFICE.

MARTIAL JOSEPH LOEHLER, OF ASNIERES, FRANCE.

ROTARY MOLD FOR MOLDING MILLING CUTTERS BY CENTRIFUGAL FORCE.

Application filed February 3, 1922. Serial No. 533,788.

*To all whom it may concern:*

Be it known that I, MARTIAL JOSEPH LOEHLER, residing at 116 Rue des Bourguignons, Asnieres, Seine, France, have invented certain new and useful Improvements in Rotary Molds for Molding Milling Cutters by Centrifugal Force, of which the following is a specification.

Milling cutters and worm hobs may directly be made by the application of centrifugal force, if to obtain solid cutters steel is run into a rotary mold having a vertical axis or into a rotary mold having a horizontal axis to obtain cutters having a bore.

When however it is desired to make profile cutters and end mills such as those for cutting gear or again cutters of concave or convex shape, then the arrangement of the mold must substantially be modified.

This invention has for its object an arrangement of a rotary mold especially adapted for this object. It comprises a central portion formed in one or more parts, the inner walls of which reproduce in intaglio the shape or shapes of the teeth of the cutter desired, such parts being fitted and clamped in any manner between two centering cones. One of the cones is itself centered on the means for driving the mold while the other is provided with a hole for feeding metal into the mold and may be combined with a refractory ring with the object of preventing any junction between the piece moulded and the seams produced on the front face of the mold when the temperature is sufficiently high.

This arrangement allows the removal of the mold and remoulding to be effected more easily than with the entirely metal types of molds hitherto used. It has further the advantage of eliminating all scarring in the median plane of the mold, of bringing the slight seams which are nearly always formed at the circumferences of the mold into axial planes in which a molding operation should in all cases be effected at the moment of setting the moulded piece.

The invention is illustrated in the accompanying drawings in which:

Figure 1 is a partial section of one form of mold taken through a vertical plane passing through its longitudinal axis $m$—$m$ which is also its axis of rotation.

Figure 2 is a partial transverse section on the plane $a$—$a$ of Figure 1.

Figure 3 is a perspective view of one of the mold wedges.

Figure 4 is a partial view similar to that in Figure 1 of a modified form of mold for making three-profile cutters whose teeth have the shape shown in elevation in Figure 5 and Figure 6 which is a development in a plane normal to the plane of Figure 5.

Figure 5:
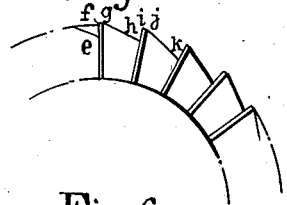
Figure 8:
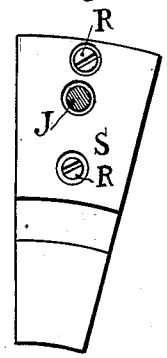
Figure 8 is an elevation showing a detail of one of the toothed sectors.

The mold comprises sectors 1, 2, 3, etc. equal in number to the number of teeth on the cutter and whose internal faces reproduce in intaglio the outer profile of a tooth P.

Wedges such as $1^a$, $2^a$, $3^a$, etc., are in number equal to the number of the hollows between the teeth and each wedge is placed when molding between two consecutive sectors.

The sectors and wedges have plane faces such as $a$, $b$, $c$ and $d$, etc., and the sectors are inclined respectively one to the other, which arrangement on mounting the mold allows the assemblage of sectors and wedges to be correctly centered upon centering cones A and B.

A central piece D serves to centre the assemblage above described with respect to a supporting plate E, the cone A being fast with D either by friction or by a cone arrangement. The centering of the piece D on the plate E is obtained by the aid of a small circular plate F in one with the plate E or fast with it (and through whose centre passes the centre of rotation) and of a corresponding socket formed in the piece D in which engages the plate F upon which is fixed the shaft through which the movement of rotation is imparted to the mold.

At the feed side is a metal ring G on which the cone B is mounted and which is maintained in position by any suitable means; the ring rests against the mold C composed as has been above described of sectors and wedges. The ring G has a central bore of suitable diameter and is cut away to receive a second ring H formed of refractory material which is provided with a central bore adapted for the inlet of liquid metal; the metal is, when the mold has its axis of rotation vertical, directly poured into the mold but through a channel when the mold has a horizontal axis of rotation. The object of the ring H is to prevent seams of metal forming on its front face becoming connected with the mass of the cast for the internal wall of the bore of this ring allows the flow of the liquid metal which will then no longer form a connection between the cast and projections which may solidify upon the front face of the mold when the temperature is sufficient.

The plate or ring H of refractory material (which may be armoured if desired) is maintained in the ring G either by its mere frictional fit in the recess in the ring G or by any other suitable means.

The sectors 1, 2, 3, etc., are provided respectively with transverse channels I for the passage of the assembling bolts J. Some of these bolts are longer than others and these connect the mold assemblage with the plate E. The diameter of the channels I is larger than that of the bolts so as to allow for the unequal expansion of the several parts which they connect.

The piece D is provided with a conical hollow portion K in order that the end mills can be moulded while when it is desired to mold other cutters the hollow is cut off by a circular plate L of refractory material which engages a socket M formed in the piece D and shown in dotted lines in Figure 1.

To make solid cutters of any shape a mold made as above described and given a movement of rotation about a vertical axis is employed and liquid steel is gently poured in until the mold is full, the speed of the mold being progressively lessened so as to allow the cavity which is formed particularly at high speeds of rotation to become filled.

In order to make cutters of any shape which require the bore to be subsequently machined a mold is employed to which is given a movement of rotation about a horizontal axis.

Figure 6:
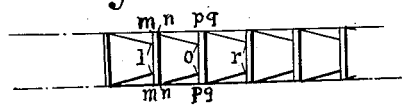
Figure 7:
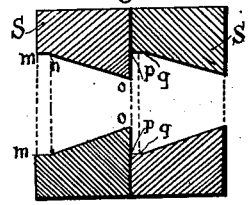
Figure 7 is a partial transverse section on the line 6—6 of Figure 4.

If it be desired to make three-profile cutters whose teeth have the shape indicated in Figures 5 and 6 the arrangement of sectors and wedges shown in Figure 1 is replaced by a disk Q as in Figure 4, whose inner walls reproduce in intaglio the outside profile of the teeth $e, f, g, h, i, j, k$ (Figure 5), such portions being symmetrically arranged while cheeks are closely secured thereto by screws R having countersunk cylindrical heads or by any other suitable means; these cheeks are formed of juxtaposed toothed sectors S whose internal faces reproduce in intaglio the profile $l, m, n, o, p, q, r$ (Figure 6). For the purpose of fitting the sectors S to the disk Q the side faces of the disk Q are provided with notches in correspondence with feathers on the sectors S. The parts are arranged and secured in the manner shown in Figure 1 between two centering cones A and B and bolts J, all the other parts of the mold being the same as for the mold shown in Figure 1.

The channels in the sectors S for the screws R and for their heads are made slightly larger than is necessary in order to allow of the unequal and independent expansion of the central disk Q and the sectors S.

Figure 9:
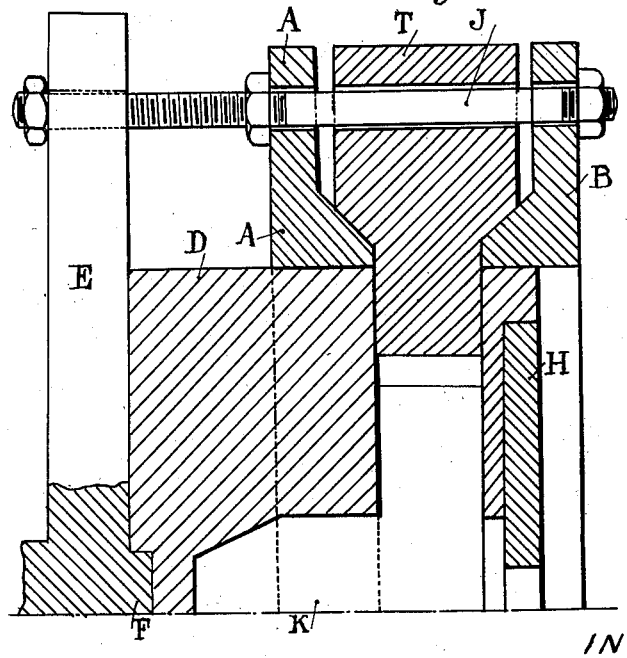
Figure 9 is a partial view similar to that in Figure 1 of a modified form of mold for making saw or slot milling cutters.

If it be desired to mold slot milling cutters or saw cutters the arrangement of sectors and wedges, Figure 1, is replaced as shown in Figure 9 by a single ring T whose inner walls reproduce in intaglio the profile of the cutter, the arrangement being centered as before between two wedges A and B, the mold otherwise remaining unchanged. With this arrangement the unequal expansion of different portions of the mold will have for effect rather to favour the removal of the mold as the disk T expands by the heat of the cast more rapidly than the wedges A and B.

What I claim is:—

1. In a rotary mold for molding steel milling cutters the combination with a central member whose inner wall reproduces in intaglio the profile of the teeth of the cutter of a pair of cones for centering the member, a driving member upon which one of said cones is centered, and an inlet for metal formed in the other said cone.

2. In a rotary mold for molding steel milling cutters the combination with a central member formed of a plurality of sectors whose inner wall reproduces in intaglio the profile of the teeth of the cutter of a pair of cones for centering the member, a driving member upon which one of said cones is centered, and an inlet for metal formed in the other said cone.

3. In a rotary mold for molding steel milling cutters the combination with a central member whose inner wall reproduces in intaglio the profile of the teeth of the cutter of a pair of cones for centering the member, a driving member upon which one of said cones is centered, and a ring of refractory material whose bore forms the inlet for the metal.

4. In a rotary mold for molding milling cutters the combination with a central member formed of alternating sectors and wedges, the inner walls of each of said sectors reproducing in intaglio the external profile of a tooth of the cutter and each wedge forming the cavity between said teeth, of a pair of cones for centering the assemblage of sectors and wedges, a driving member upon which one of said cones is centered and an inlet for metal formed in the other said cone.

5. In a rotary mold for molding steel milling cutters the combination with a central ring member whose inner wall reproduces in intaglio the profile of the teeth of the cutter, a pair of rings extending beyond the central member to form cheeks thereto, a pair of cones co-operating with cones on the cheek members for centering the assemblage, a driving member upon which one of said cones is centered, and an inlet for metal formed in the other said cone.

In testimony whereof I affix my signature.

MARTIAL JOSEPH LOEHLER.